US012636690B2

(12) United States Patent
Chen et al.

(10) Patent No.: US 12,636,690 B2
(45) Date of Patent: May 26, 2026

(54) HANDHELD SOIL FIXED-POINT DISINFECTION DEVICE FOR CROP GROWTH PERIOD

(71) Applicants: KUNMING CO YUNNAN TOBACCO CO, Kunming (CN); SOUTHWEST FORESTRY UNIVERSITY, Kunming (CN)

(72) Inventors: Yaqiong Chen, Kunming (CN); Qingli Han, Kunming (CN); Liqing Ge, Kunming (CN); Jie Li, Kunming (CN); Xingyang Xu, Kunming (CN); Xueying Han, Kunming (CN); Youguo Zhan, Kunming (CN); Dongya Xu, Kunming (CN); Fenfen Zhang, Kunming (CN); Dexun Kong, Kunming (CN)

(73) Assignees: KUNMING CO YUNNAN TOBACCO CO, Kunming (CN); SOUTHWEST FORESTRY UNIVERSITY, Kunming (CN)

( * ) Notice: Subject to any disclaimer, the term of this patent is extended or adjusted under 35 U.S.C. 154(b) by 349 days.

(21) Appl. No.: 18/515,361

(22) Filed: Nov. 21, 2023

(65) Prior Publication Data

US 2024/0375160 A1     Nov. 14, 2024

(30) Foreign Application Priority Data

May 8, 2023     (CN) .......................... 202310505838.5

(51) Int. Cl.
    *B09C 1/08*          (2006.01)
    *A01M 13/00*          (2006.01)

(52) U.S. Cl.
    CPC .............. *B09C 1/08* (2013.01); *A01M 13/00* (2013.01); *B09C 2101/00* (2013.01)

(58) Field of Classification Search
    CPC ....... B09C 1/08; B09C 2101/00; A01M 13/00
    (Continued)

(56) References Cited

U.S. PATENT DOCUMENTS 1,624,033 A * 4/1927 Barnard .............. A01M 21/043
                                                    111/7.2
2,580,755 A * 1/1952 Funk ................... A01M 17/002
                                                    417/328
    (Continued)

FOREIGN PATENT DOCUMENTS

CN          102984933 A       3/2013
CN          107242055 A       10/2017
    (Continued)

*Primary Examiner* — Tara Mayo
(74) *Attorney, Agent, or Firm* — Bayramoglu Law Offices LLC

(57)     ABSTRACT

A handheld soil fixed-point disinfection device for a crop growth period is provided. The device includes a top-opened barrel, the barrel being internally divided into a liquid storage chamber and an assembly chamber; a plurality of support rods fixed at a bottom of the barrel; a target ring fixed at bottoms of the plurality of support rods and configured to contact a ground fixed point; a needle provided between the plurality of support rods and capable of being inserted into soil through the target ring to inject a fumigant liquid; and a force accumulation mechanism provided on the barrel and configured to eject the needle.

9 Claims, 16 Drawing Sheets

(58) Field of Classification Search
     USPC ........................................... 111/7.1–7.4, 127
     See application file for complete search history.

(56) <div align="center">References Cited</div>

<div align="center">U.S. PATENT DOCUMENTS</div>

| | | | | | |
|---|---|---|---|---|---|
| 3,405,669 | A | * | 10/1968 | Nimrick | A01G 27/008 |
| | | | | | 175/313 |
| 4,637,161 | A | * | 1/1987 | Turner | A01M 1/2094 |
| | | | | | 43/132.1 |
| 5,727,484 | A | * | 3/1998 | Childs | A01C 23/026 |
| | | | | | 239/271 |
| 6,966,145 | B1 | * | 11/2005 | Taft et al. | A01M 17/002 |
| | | | | | 43/132.1 |

<div align="center">FOREIGN PATENT DOCUMENTS</div>

| | | | |
|---|---|---|---|
| CN | 107372446 | A | 11/2017 |
| CN | 208579949 | U | 3/2019 |
| CN | 212306318 | U | 1/2021 |
| CN | 213813988 | U | 7/2021 |

* cited by examiner

HANDHELD SOIL FIXED-POINT DISINFECTION DEVICE FOR CROP GROWTH PERIOD

CROSS REFERENCE TO THE RELATED APPLICATIONS

This application is based upon and claims priority to Chinese Patent Application No. 202310505838.5, filed on May 8, 2023, the entire contents of which are incorporated herein by reference.

TECHNICAL FIELD

The present disclosure belongs to the technical field of agricultural planting, and particularly relates to a handheld soil fixed-point disinfection device for a crop growth period.

BACKGROUND

Pathogenic bacteria for soil-borne diseases exist in soil. Common bactericides cannot penetrate the soil uniformly to kill these pathogenic bacteria thoroughly. Soil fumigants can release an active gas in the soil to kill harmful organisms. Moreover, the gas can go into the soil uniformly to kill the pathogenic bacteria thoroughly. With no residue in the soil and safety to foods and environments, fumigants are considered the most direct and effective method to control soil-borne diseases of crops. At present, the commercially available fumigants mainly include vikane in a gas form, metham, dimethyl disulfide, allyl isothiocyanate, and chloropicrin in a liquid form, and dazomet in a fine granular form. The liquid fumigants and the granular fumigants are applied most. The fumigants come as non-selective drugs and are used before the crops are planted. Usually, the liquid fumigants are to be injected or dripped into the soil for a depth of 30 cm, and a plastic film is used for covering the soil. The granular fumigants can be directly spread over the soil and are mixed uniformly with the soil by a rotary cultivator. Thereafter, a film is used to cover the soil, and a gas is generated in the soil under the film. After a certain time, the film is uncovered. Sowing cannot be performed until the gas from the fumigants in the soil is volatilized completely.

The soil fumigants kill the pathogenic bacteria in the soil before planting and thus are unavailable to control seed-borne diseases caused by bacteria on seeds or seedlings during planting. Concerning highly infectious diseases caused by seed dispersal in production, diseased plants are to be removed and the soil around the diseased plants disinfected. For example, for such highly infectious bacterial diseases as tobacco bacterial wilt and ginger bacterial wilt, the diseased plants need to be removed, and fixed-point disinfection is performed on the diseased plant pond to kill residual *Ralstonia solanacearum* in the soil. The liquid chloropicrin is quite effective in killing the *Ralstonia solanacearum*. Whether in large-scale disinfection or fixed-point disinfection, the chloropicrin is injected into the soil for a depth of 30 cm with the assistance of a professional device. This involves high technical requirements for operation. Most fixed-point disinfection devices on the market are universal injectors, such as the Junma brand injector. The injector is made of a metal material overall and is backwardly connected to a tube in use.

However, the injector is not dedicated to soil disinfection and has a small volume. When the injector is used, there is a need for an operator to squat down to insert a needle into the soil. Due to the resistance of the soil in insertion, the long-term operation causes fatigue easily, which affects operation efficiency. Therefore, the injector is inconveniently used.

SUMMARY

The present disclosure provides a handheld soil fixed-point disinfection device for a crop growth period, to solve the problem that an existing injector is manually inserted into soil by an arm to easily cause a fatigue to affect an operation efficiency.

The present disclosure employs the following technical solutions: A handheld soil fixed-point disinfection device for a crop growth period includes a top-opened barrel, the barrel being internally divided into a liquid storage chamber and an assembly chamber; a plurality of support rods fixed at a bottom of the barrel; a target ring fixed at bottoms of the plurality of support rods and configured to contact a ground fixed point; a needle provided between the plurality of support rods and capable of being inserted into soil through the target ring to inject a fumigant liquid; and a force accumulation mechanism provided on the barrel and configured to eject the needle.

Preferably, a water pump is provided in the assembly chamber, and the water pump includes a liquid feed tube communicating with the liquid storage chamber, and a liquid discharge tube extending out of the barrel and detachably connected to the needle.

Preferably, the force accumulation mechanism includes a fixed sleeve slidably provided between the plurality of support rods and detachably connected to the needle; a force accumulation box fixed at one side of the barrel; a linkage plate slidably provided at a bottom of the force accumulation box and fixedly connected to the fixed sleeve; a first slider slidably provided in the force accumulation box and fixedly connected to the linkage plate; a first spring provided in the force accumulation box and located at a top of the first slider; a second slider slidably provided in the force accumulation box and located at a top of the first spring; an adjusting bolt threadedly provided at a top of the force accumulation box and configured to abut against the second slider; and a magnetic strip fixed at one side of the force accumulation box and configured to absorb and fix the first slider.

Preferably, a top cover for sealing the liquid storage chamber is threadedly provided at a top of the barrel, and a handheld adjusting mechanism is provided on the top cover.

Preferably, the handheld adjusting mechanism includes a support stud fixed at a top of the top cover; a support threaded insert threadedly sleeved on the support stud; a U-shaped seat fixed at a top of the support threaded insert; a connecting member adjustably provided on the U-shaped seat with a bolt; and a connecting rod fixed on the connecting member and provided with a handle.

Preferably, the handheld adjusting mechanism includes a support stud threadedly provided on the top cover in a penetrating manner; a support threaded insert threadedly sleeved on the support stud; a U-shaped seat fixed at a top of the support threaded insert; a connecting member adjustably provided on the U-shaped seat with a bolt; a connecting rod fixed on the connecting member and provided with a handle; and an air compression plate slidably provided in the liquid storage chamber and fixedly connected to the support stud.

Preferably, an electric control box is fixed on the linkage plate, a trigger switch is detachably provided in the electric control box by a lid, and a trigger post corresponding to the trigger switch is slidably provided at a bottom of the electric control box.

Preferably, a grounding sheet is fixed at a bottom of the trigger post, a second spring and a rubber sleeve located between the electric control box and the grounding sheet are provided outside the trigger post, and the second spring is located in the rubber sleeve.

Preferably, an outer race of the target ring is a threaded structure, a soil taking hood is threadedly sleeved on the target ring, and a bottom race of the soil taking hood is provided in a cutting edge.

Preferably, a soil moisture content sensor is fixed at one side of the linkage plate, and an insertion end of the soil moisture content sensor is lower than the grounding sheet.

The handheld soil fixed-point disinfection device provided by the present disclosure has the following beneficial effects over the related art:

Compared with the prior art, the handheld soil fixed-point disinfection device for a crop growth period not only is more labor-saving and simpler in use by ejecting the piercing needle, but also can be adapted for different people and used more comfortably through the handle with an adjustable angle and an adjustable length. The present disclosure supplies the liquid automatically in an automatic triggering manner. Furthermore, the present disclosure is multifunctional and low in cost, suitable for various usage scenarios.

In the figures: 1: barrel, 2: liquid storage chamber, 3: assembly chamber, 4: support rod, 5: target ring, 6: needle, 7: water pump, 8: liquid feed tube, 9: liquid discharge tube, 10: fixed sleeve, 11: force accumulation box, 12: linkage plate, 13: first slider, 14: first spring, 15: second slider, 16:

adjusting bolt, 17: magnetic strip, 18: top cover, 19: support stud, 20: support threaded insert, 21: U-shaped seat, 22: connecting member, 23: connecting rod, 24: handle, 25: electric control box, 26: trigger switch, 27: trigger post, 28: grounding sheet, 29: second spring, 30: rubber sleeve, 31: soil taking hood, 32: soil moisture content sensor, 33: air compression plate, 34: air vent, 35: air adjusting tube, 36: waistband, and 37: battery pack.

DETAILED DESCRIPTION OF THE EMBODIMENTS

Unless otherwise defined, all technical and scientific terms used in the present disclosure have the same meanings as commonly understood by those skilled in the technical field of the present disclosure. The terms used in the specification of the present disclosure are merely intended to describe the specific embodiments, rather than limit the present disclosure. The terms "includes" and "has" in the specification, claims, and accompanying drawings of the present disclosure and any variations thereof are intended to encompass without excluding other content. The terms "first", "second", and the like in the specification and claims or the accompanying drawings of the present disclosure are intended to distinguish different objects, rather than describe a specific order or a primary/secondary relationship.

The term "embodiment" mentioned herein means that a specific feature, structure, or characteristic described in combination with the embodiment may be included in at least one embodiment of the present disclosure. The phrase appearing in different parts of the specification does not necessarily refer to the same embodiment or an independent or alternative embodiment exclusive of other embodiments. It may be explicitly or implicitly appreciated by those skilled in the art that the embodiments described herein may be combined with another embodiment.

Figure 1:
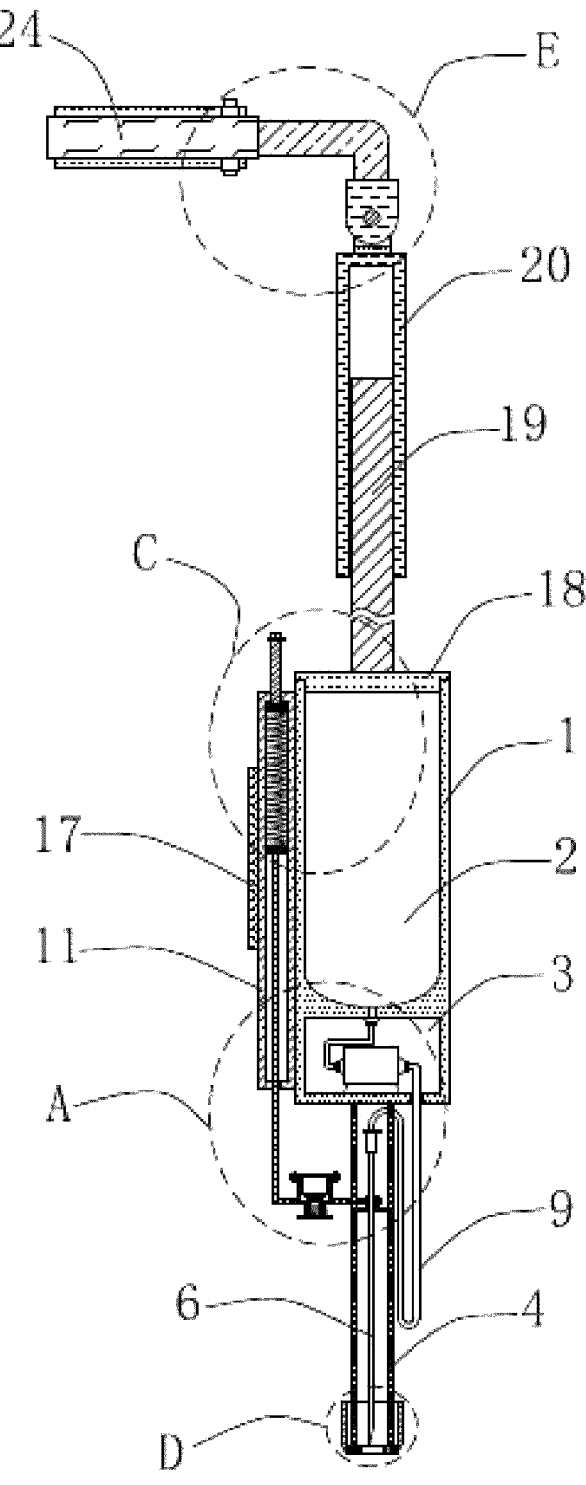
FIG. 1 is a front sectional view according to a preferred embodiment of the present disclosure.
Figure 2:
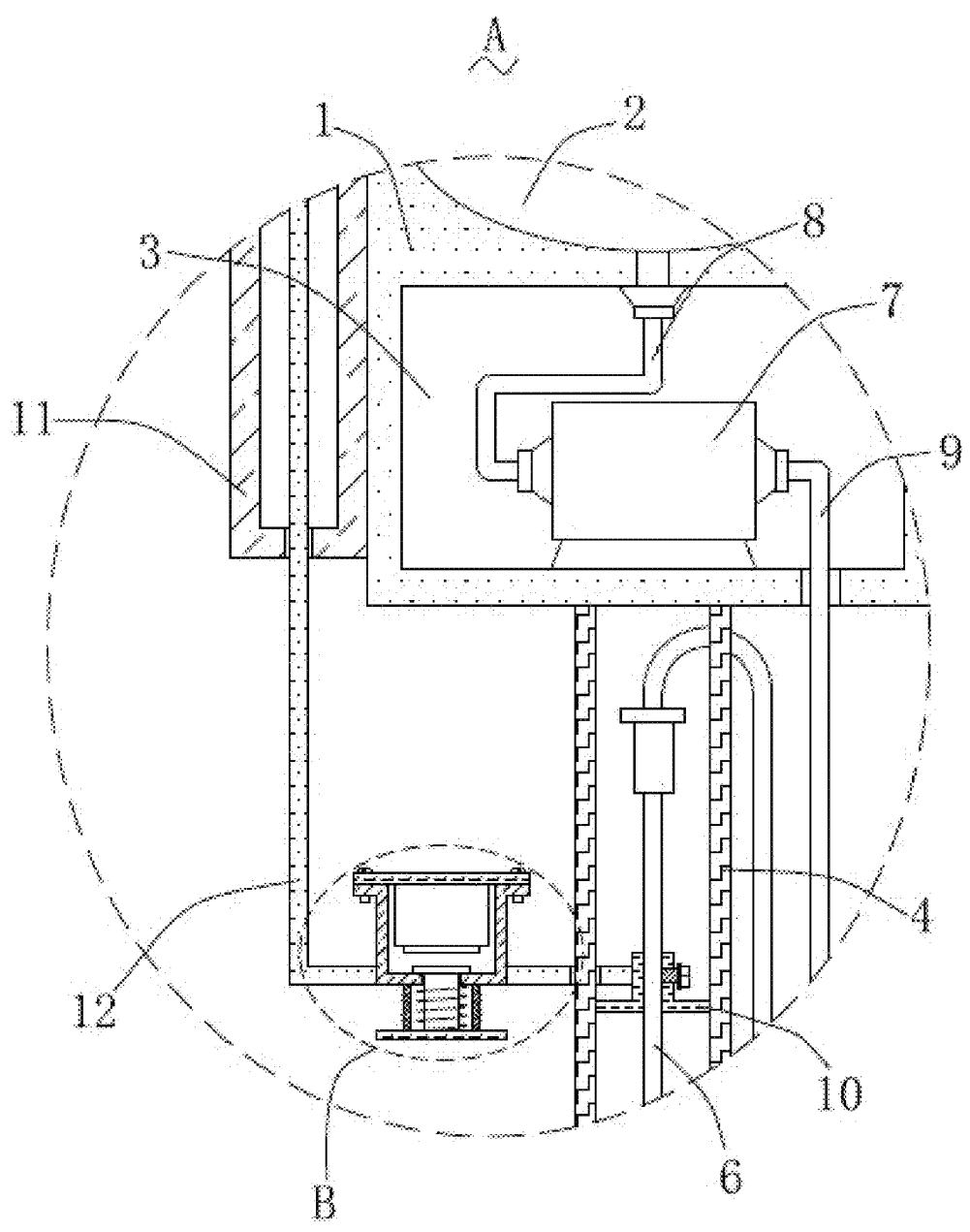
FIG. 2 is an enlarged view of a portion A shown in FIG. 1.
Figure 3:
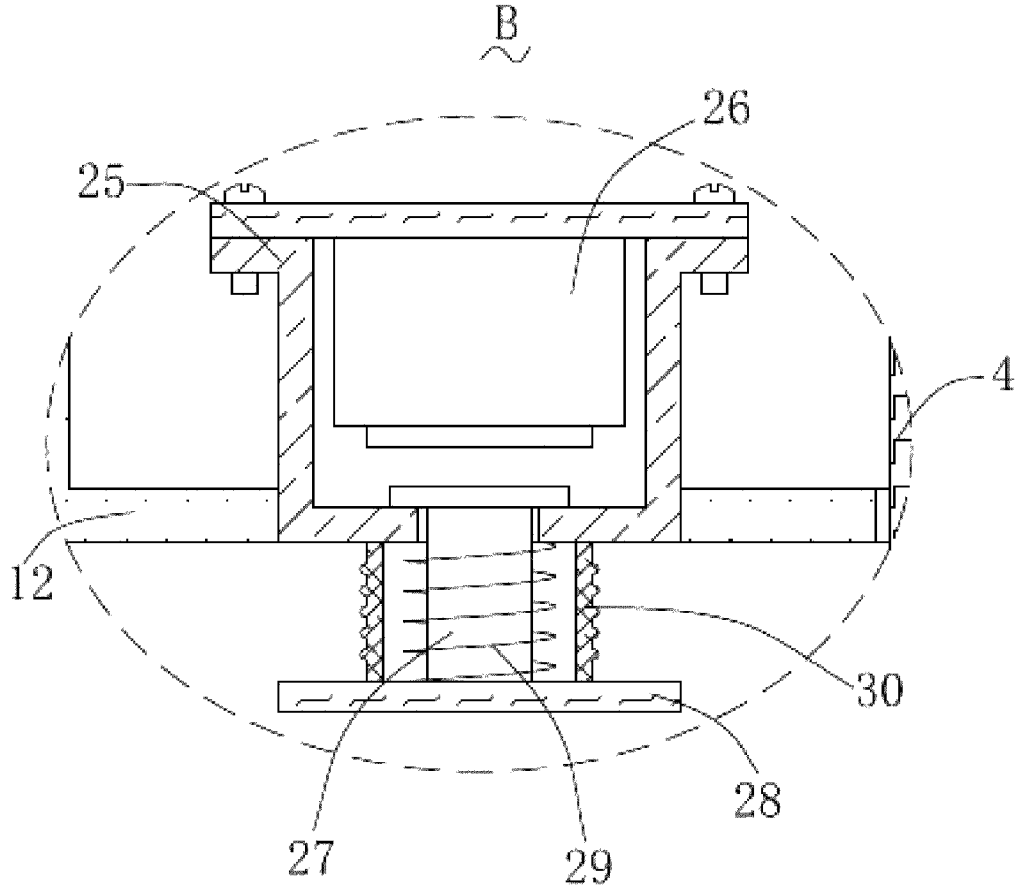
FIG. 3 is an enlarged view of a portion B shown in FIG. 2.
Figure 4:
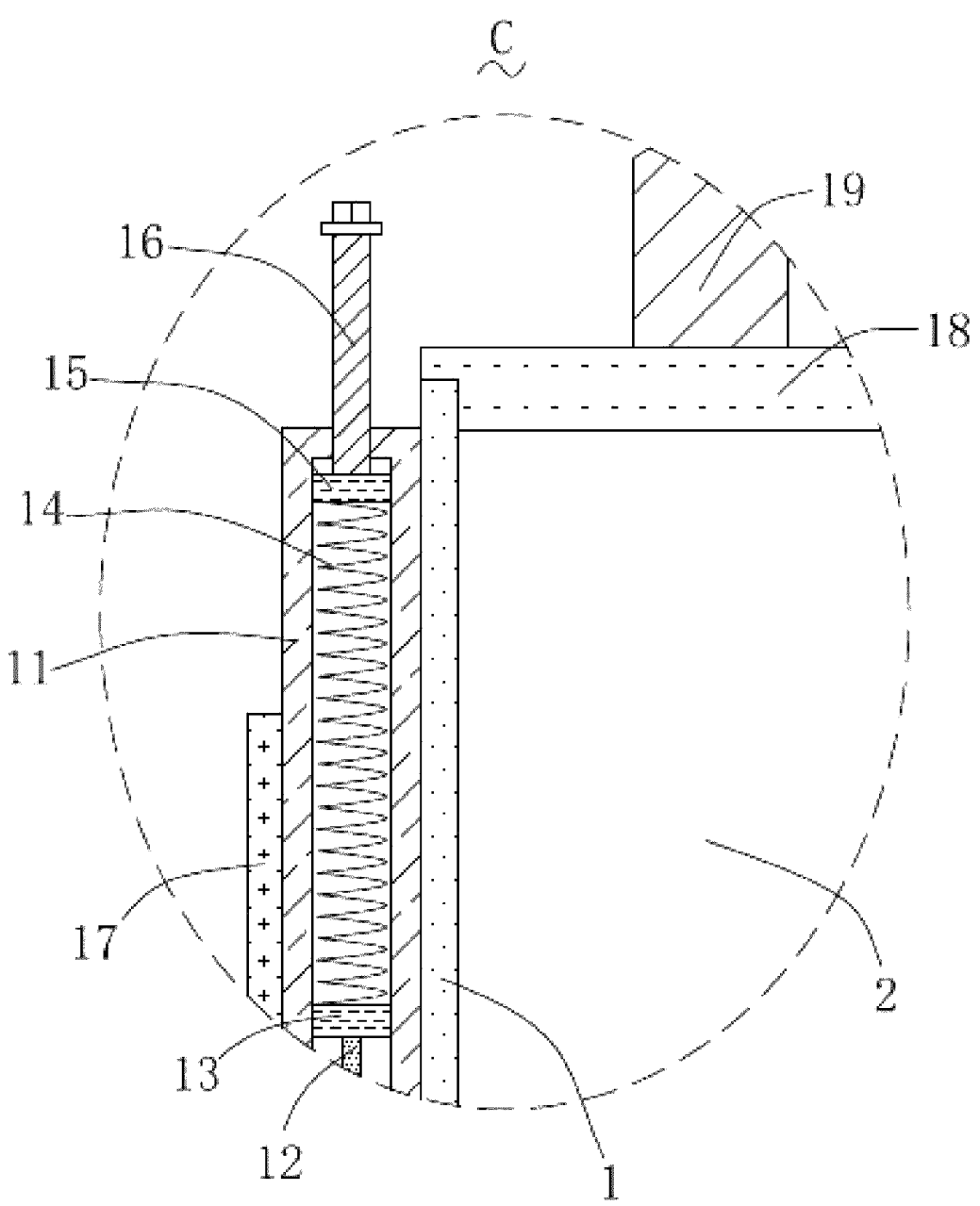
FIG. 4 is an enlarged view of a portion C shown in FIG. 1.
Figure 5:
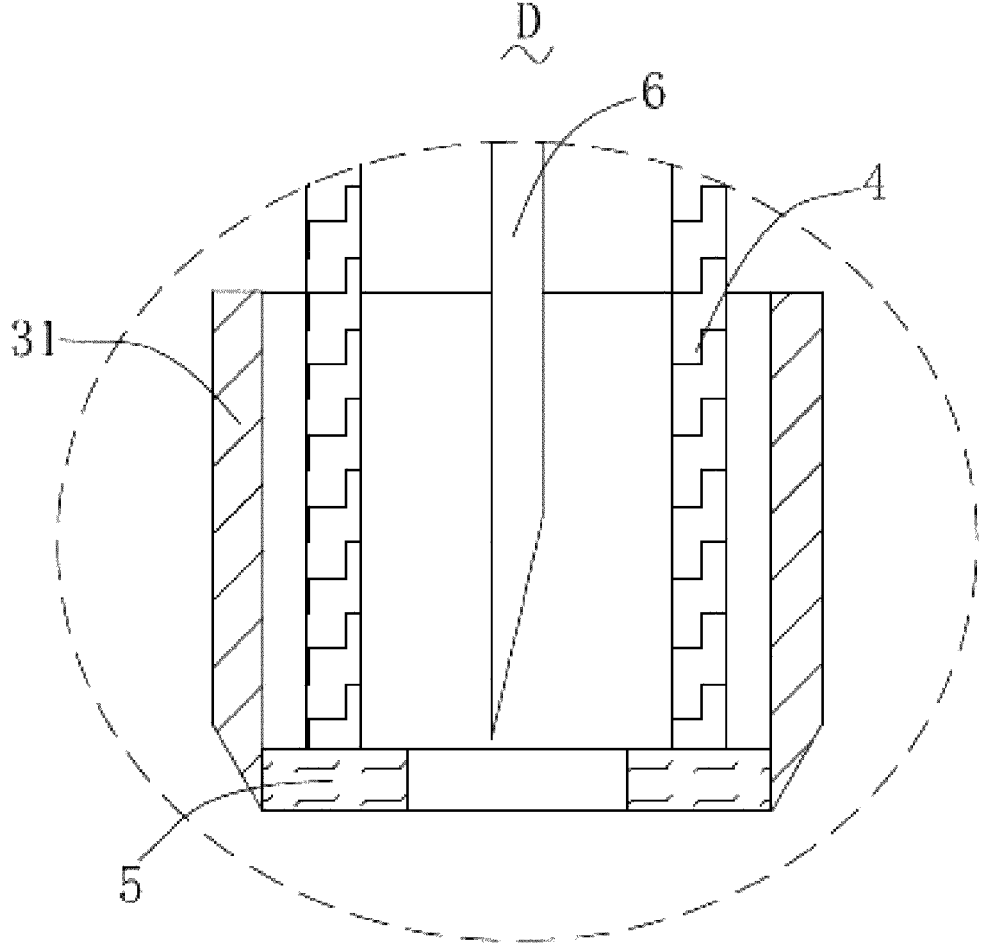
FIG. 5 is an enlarged view of a portion D shown in FIG. 1.
Figure 6:
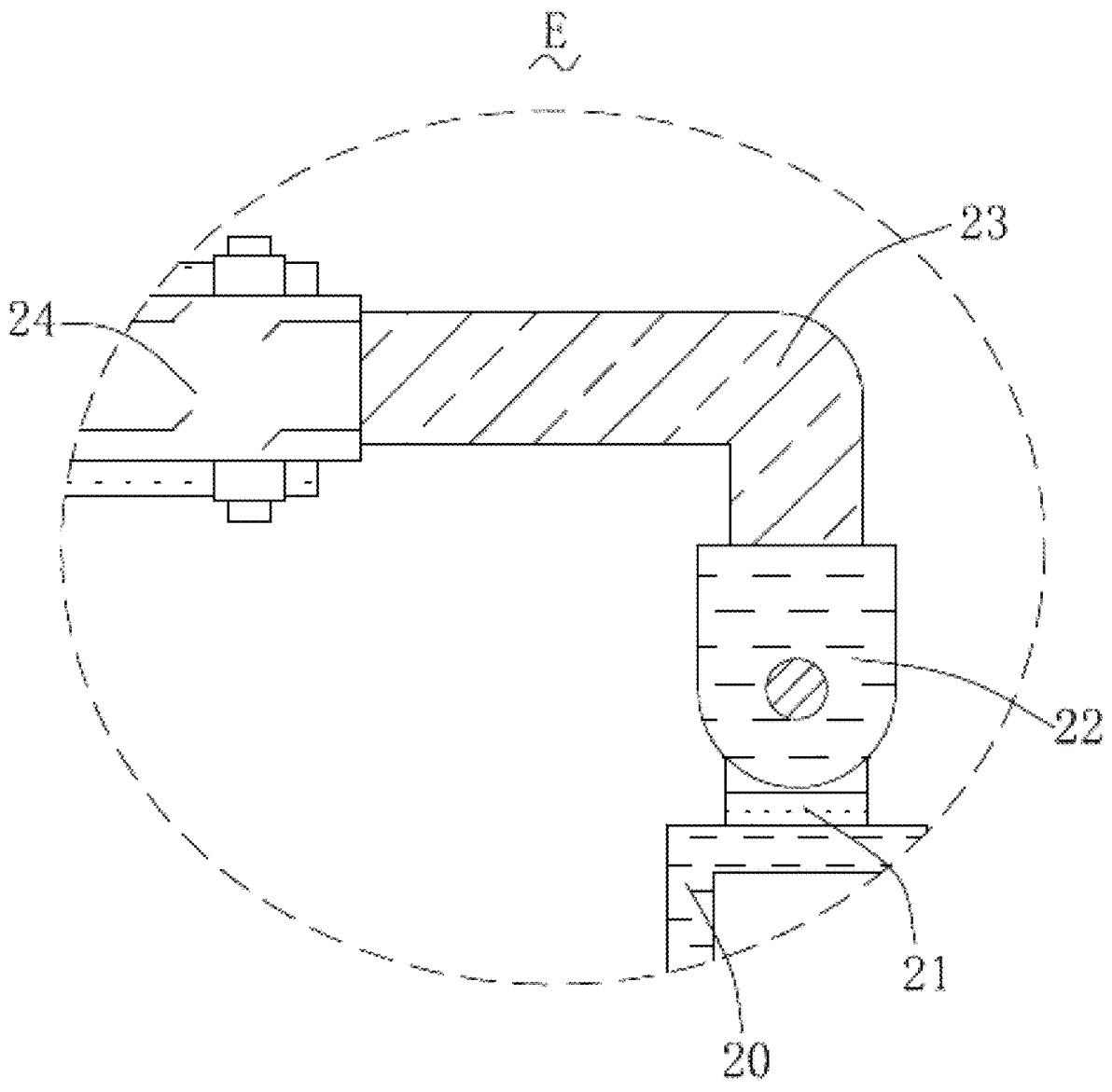
FIG. 6 is an enlarged view of a portion E shown in FIG. 1.
Figure 7:
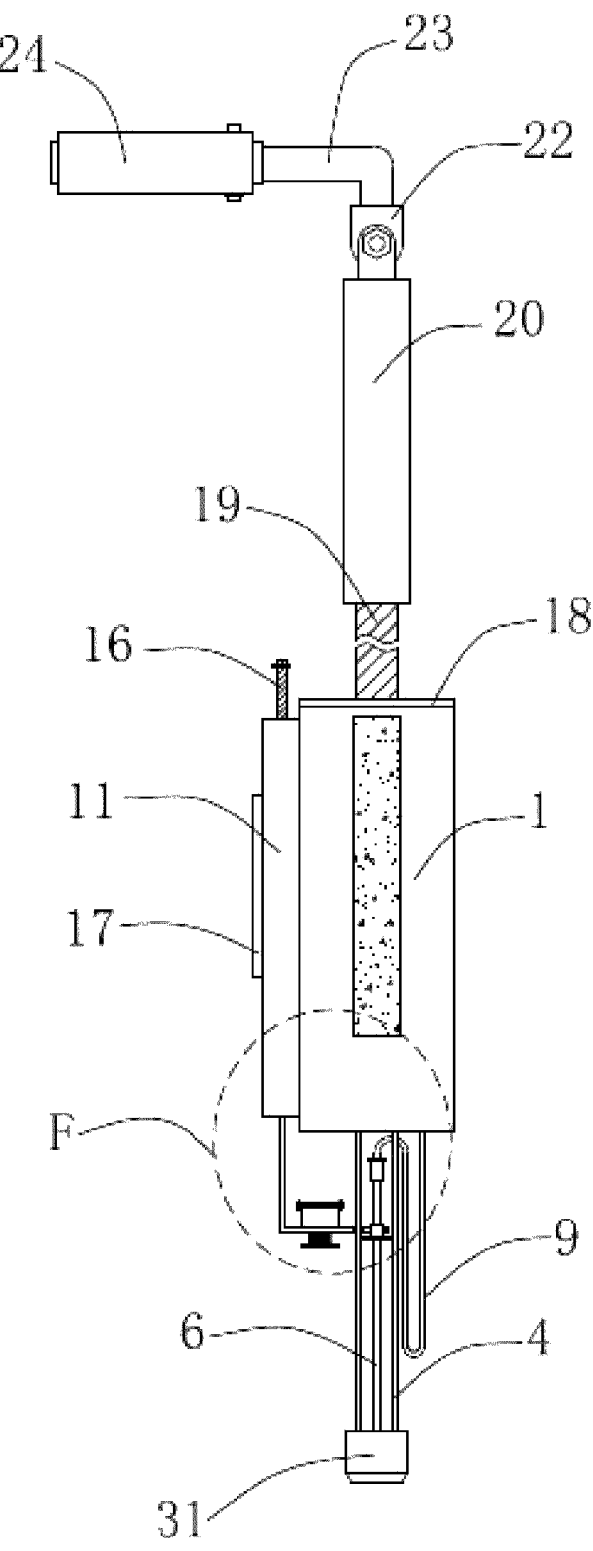
FIG. 7 is a front view according to a preferred embodiment of the present disclosure.
Figure 8:
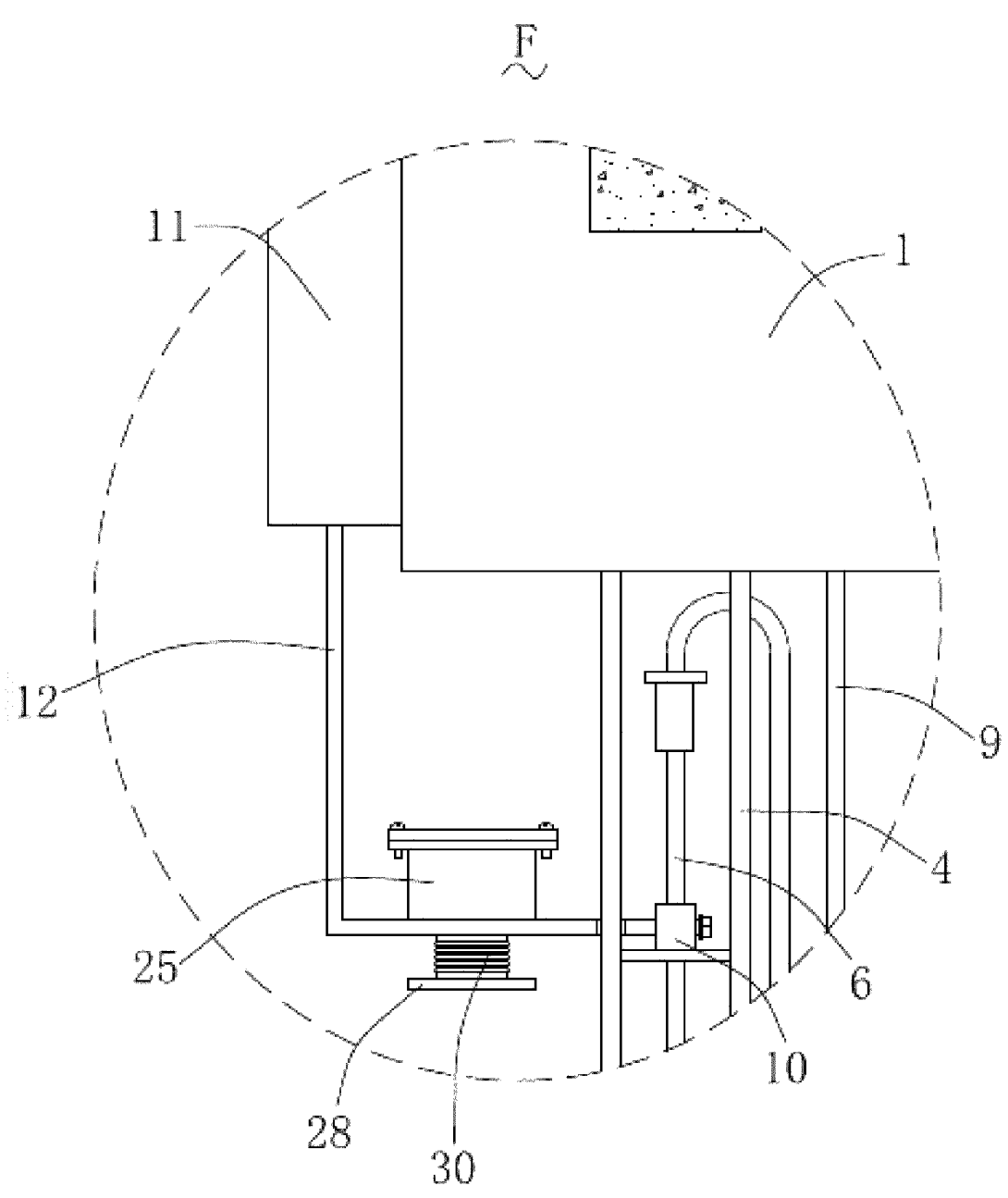
FIG. 8 is an enlarged view of a portion F shown in FIG. 7.
Figure 9:
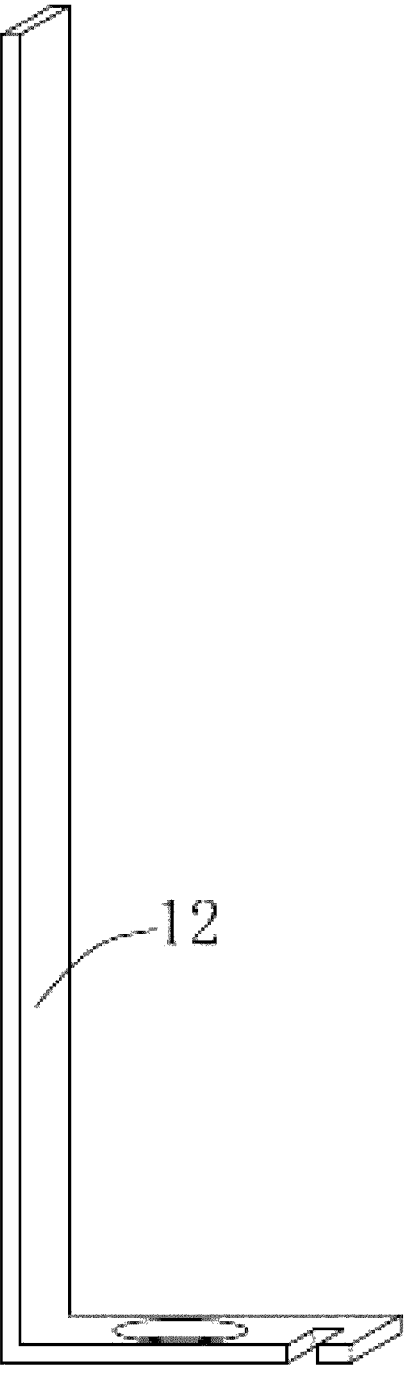
FIG. 9 is a structural view of a linkage plate according to the present disclosure.
Figure 10:
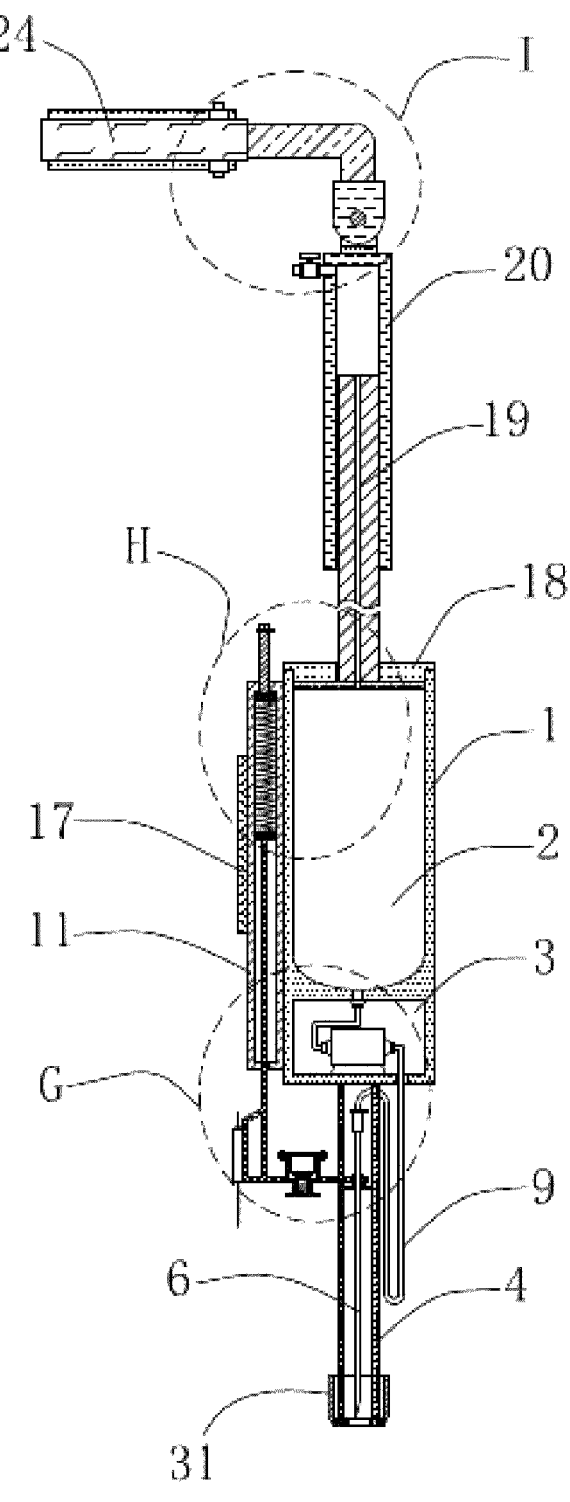
FIG. 10 is a front sectional view according to another preferred embodiment of the present disclosure.
Figure 11:
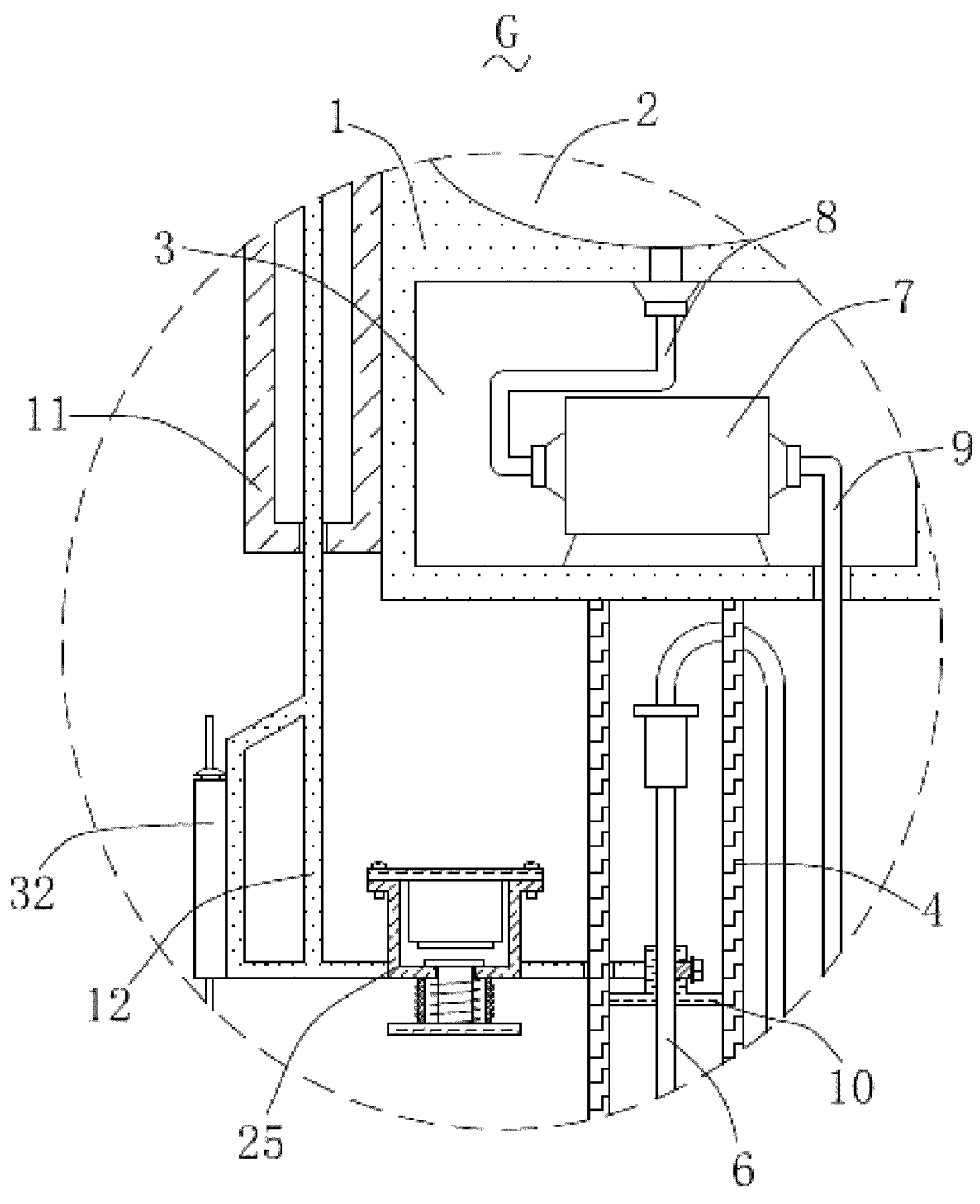
FIG. 11 is an enlarged view of a portion G shown in FIG. 10.
Figure 12:
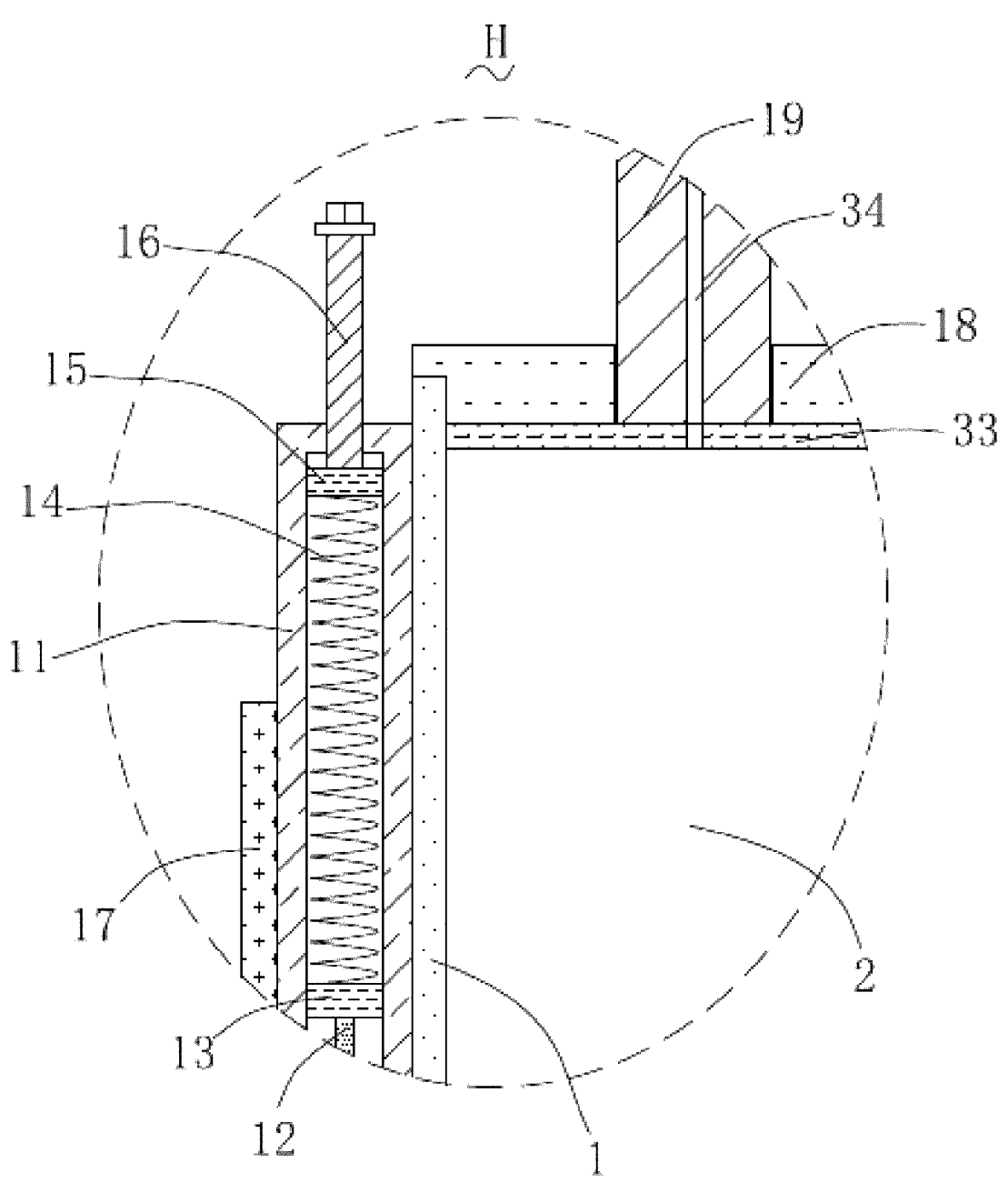
FIG. 12 is an enlarged view of a portion H shown in FIG. 10.
Figure 13:
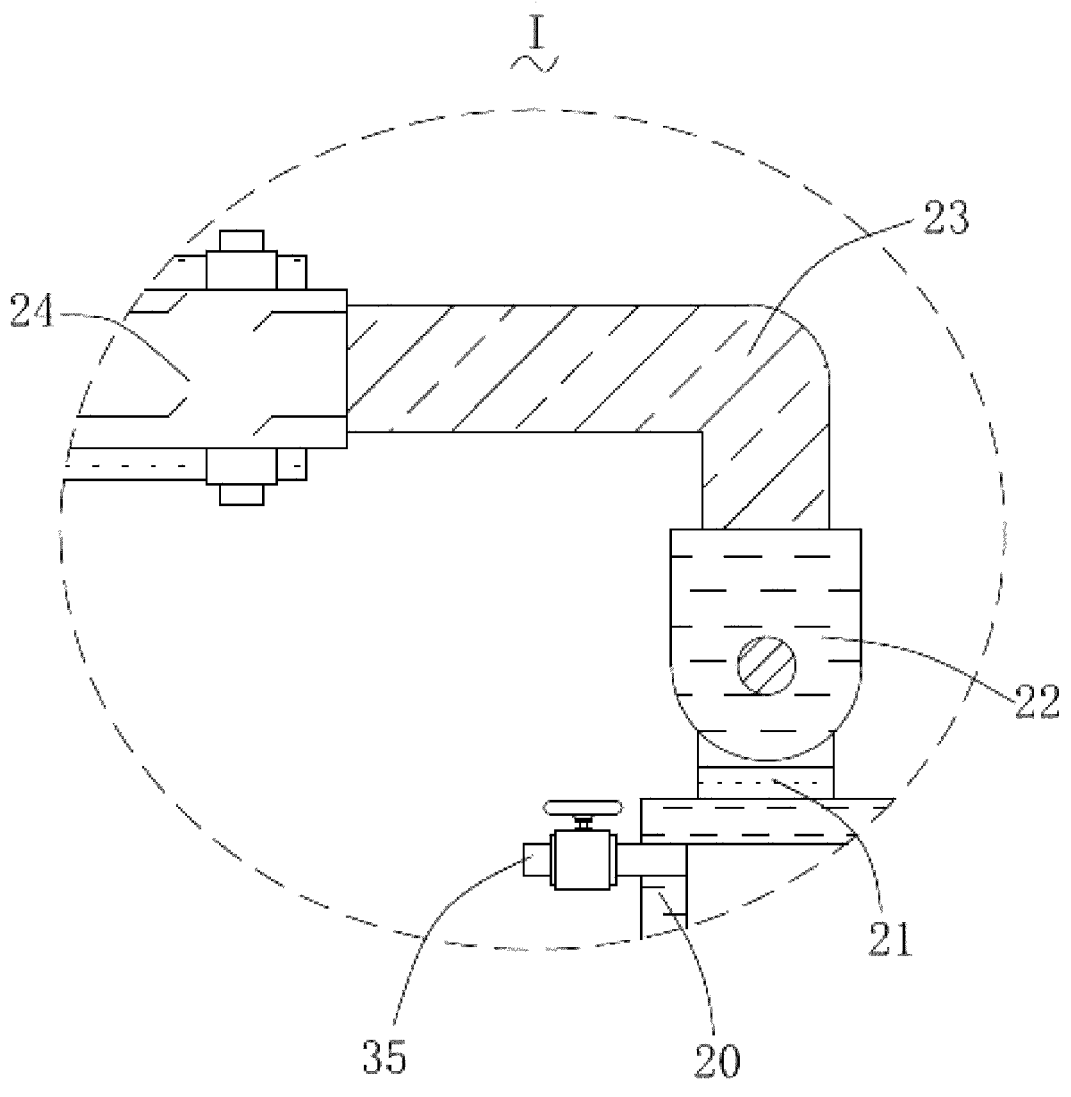
FIG. 13 is an enlarged view of a portion I shown in FIG. 10.
Figure 14:
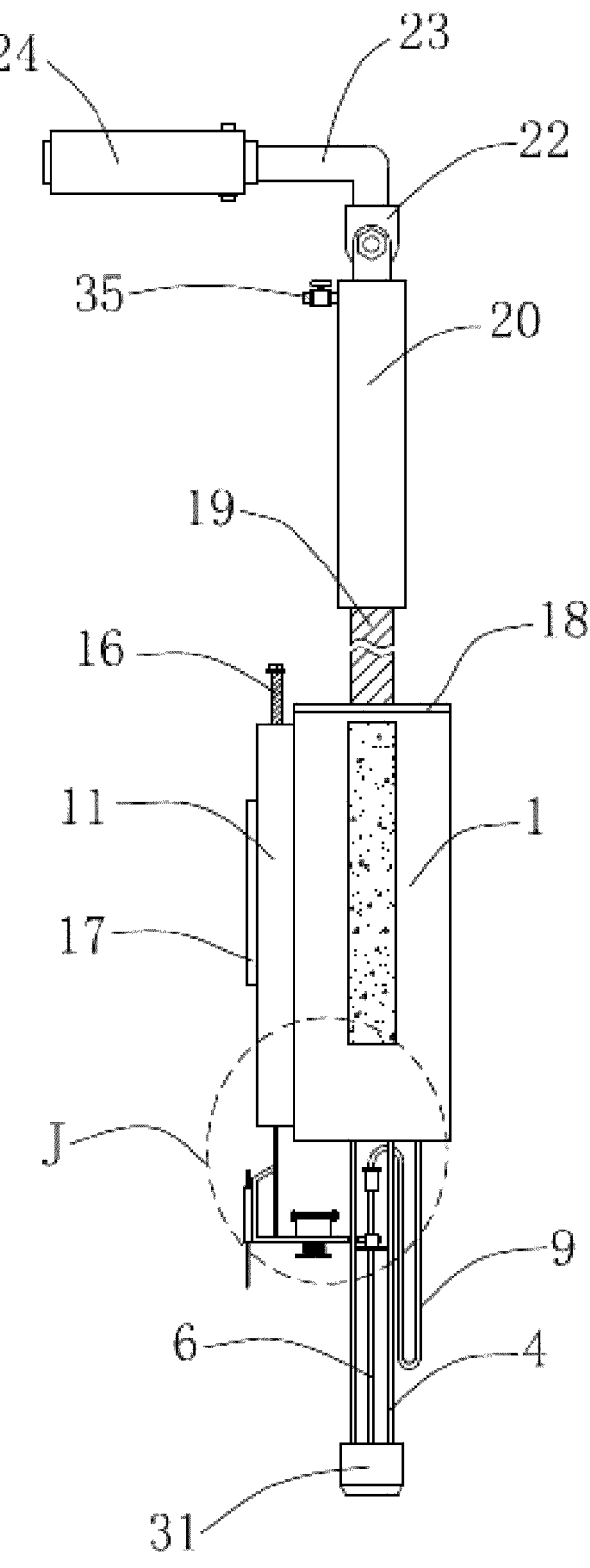
FIG. 14 is a front view according to another preferred embodiment of the present disclosure.
Figure 15:
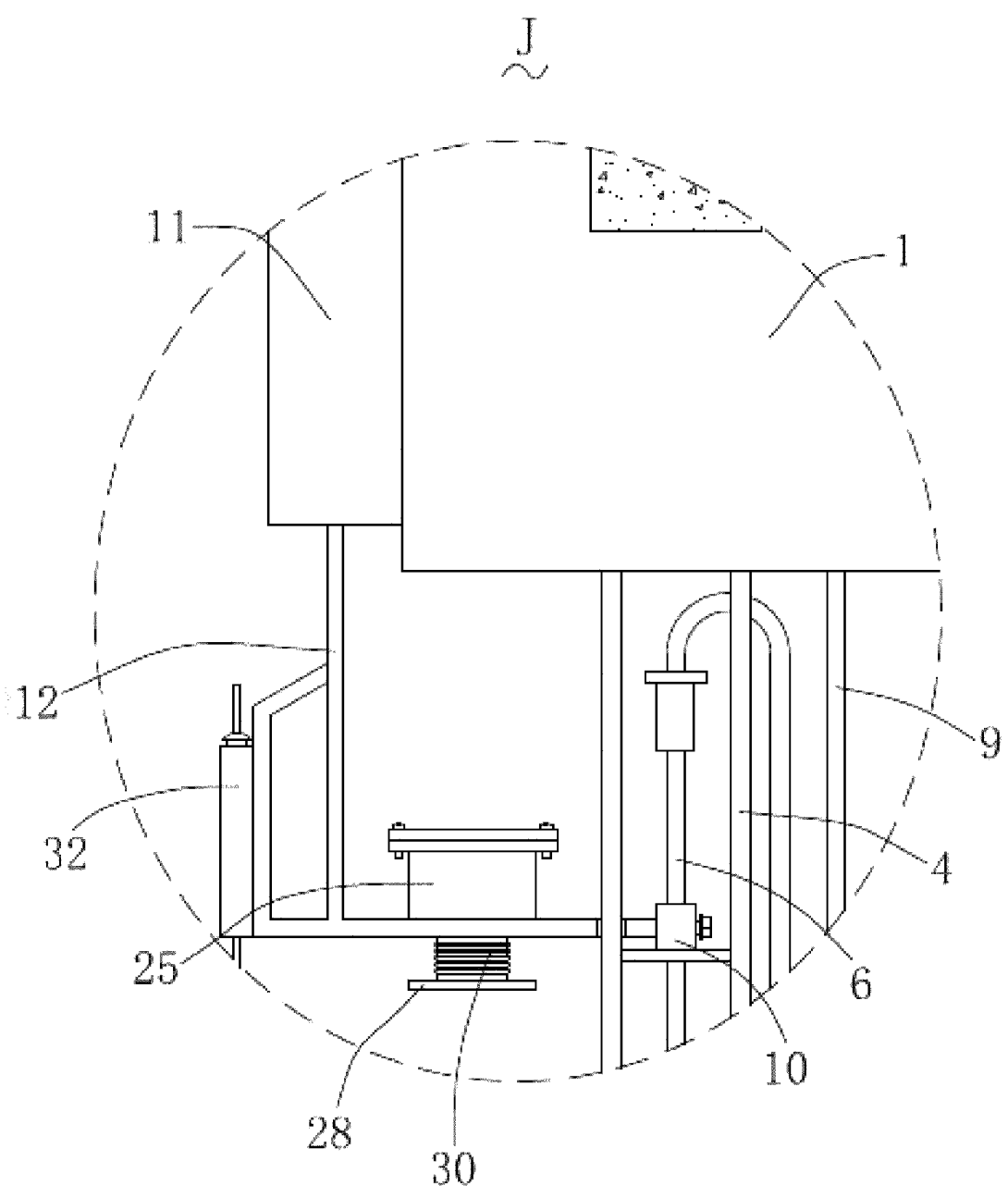
FIG. 15 is an enlarged view of a portion J shown in FIG. 14.
Figure 16:
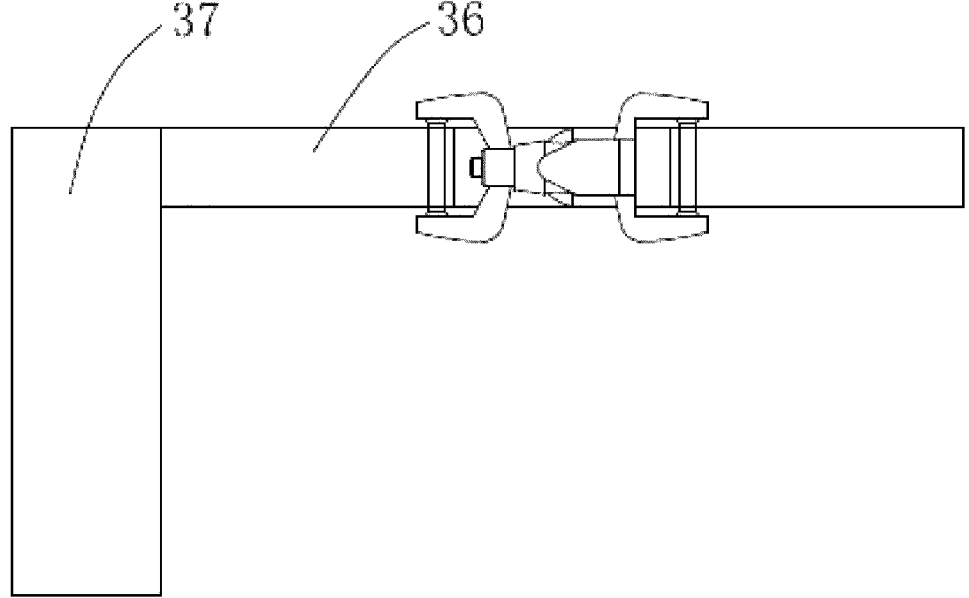
FIG. 16 is a structural view of a waistband and a battery pack according to the present disclosure.

An embodiment of the present disclosure provides a handheld soil fixed-point disinfection device for a crop growth period. As shown in FIGS. 1-16, the handheld soil fixed-point disinfection device for a crop growth period includes top-opened barrel 1, the barrel 1 being internally divided into liquid storage chamber 2 and assembly chamber 3; a plurality of support rods 4 fixed at a bottom of the barrel 1; target ring 5 fixed at bottoms of the plurality of support rods 4 and configured to contact a ground fixed point; needle 6 provided between the plurality of support rods 4 and capable of being inserted into soil through the target ring 5 to inject a fumigant liquid; and a force accumulation mechanism provided on the barrel 1 and configured to eject the needle 6.

It is to be noted that fumigants are decomposed in soil to release a gas, and have no residue in the soil and no pollution to underground water. The fumigants are favorable for environmental protection and food safety, and have been widely applied. At present, the fumigants are considered as the most direct and effective method for killing pathogenic bacteria in the soil, weeds and insects. There are liquid fumigants and powder fumigants. No matter in the liquid form or the powder form, the fumigants become the gas in the soil. The gas is an active substance to kill harmful organisms. The liquid fumigants are to be injected or dripped into the soil for a depth of 30 cm, and a plastic film is used for covering the soil. The powder fumigants can be directly spread over the soil, and are mixed uniformly with the soil by a rotary cultivator. Thereafter, a film is used for covering the soil, and a gas is generated in the soil under the film. The liquid fumigants or the powder fumigants are quickly vaporized in the soil and diffused to surrounding soil, thereby killing the pathogenic bacteria in the soil, the weeds and the insects.

The above method can be used widely in soil plowing. However, some seeds carry pathogenic bacteria after planted, and resulting diseased plants cause pollution to surrounding soil. Although all seeds are disinfected, inadequate disinfection and mid-way infection are inevitable. Frequently, after the seeds are planted, a handheld injector is used to for fixed-point disinfection. At present, most injectors are a commercially available universal injector, such as a Mustang injector. The injector is made of a metal material overall, and is backwardly connected to a tube in use.

The injector has a small volume. When the injector is used, there is a need to squat down to insert a needle into the soil. Due to a resistance of the soil in insertion, the long-time operation causes a fatigue easily to affect an operation efficiency. Therefore, the injector is used inconveniently.

In the embodiment, in order to make the needle 6 inserted into the soil more easily, the force accumulation mechanism is used to accumulate a force to eject the needle 6. The needle 6 is quickly inserted into the soil for piercing. After a fumigant liquid is injected, the needle 6 is pulled out. Then, the needle 6 and the force accumulation mechanism are restored for next use. Compared with a conventional method in which the needle is directly inserted by an arm, the present disclosure is more labor-saving and simpler. The plurality of support rods 4 and the target ring 5 are used to locate a piercing position and a disinfecting position of the needle 6, so accurate location is achieved. In the barrel 1, the liquid storage chamber 2 is configured to carry a drug solution, and the assembly chamber 3 is provided with functional members.

In a further preferred embodiment of the present disclosure, water pump 7 is provided in the assembly chamber 3. The water pump 7 includes liquid feed tube 8 communicating with the liquid storage chamber 2, and liquid discharge tube 9 extending out of the barrel 1 and detachably connected to the needle 6.

In the embodiment, when the fumigant liquid is injected, the water pump 7 is started. The water pump 7 pumps out the fumigant liquid in the liquid storage chamber 2 through the liquid feed tube 8, and discharges the fumigant liquid to the needle 6 through the liquid discharge tube 9. The liquid discharge tube 9 is a flexible tube, and can move with the needle 6.

In a further preferred embodiment of the present disclosure, the force accumulation mechanism includes fixed sleeve 10 slidably provided between the plurality of support rods 4 and detachably connected to the needle 6; force accumulation box 11 fixed at one side of the barrel 1; linkage plate 12 slidably provided at a bottom of the force accumulation box 11 and fixedly connected to the fixed sleeve 10; first slider 13 slidably provided in the force accumulation box 11 and fixedly connected to the linkage plate 12; first spring 14 provided in the force accumulation box 11 and located at a top of the first slider 13; second slider 15 slidably provided in the force accumulation box 11 and located at a top of the first spring 14; adjusting bolt 16 threadedly provided at a top of the force accumulation box 11 and configured to abut against the second slider 15; and magnetic strip 17 fixed at one side of the force accumulation box 11 and configured to absorb and fix the first slider 13.

In the embodiment, when the force accumulation mechanism is used, the needle 6 is sleeved and fixed by the fixed sleeve 10. An extension length of the needle 6 can be adjusted, thereby adjusting a maximum insertion depth. The linkage plate 12 slides to the force accumulation box 11, thereby pushing the first slider 13 to slide and cooperate with the second slider 15 to compress the first spring 14. The first spring is compressed as required in use. Upon completion of compression, the magnetic strip 17 (the magnetic strip 17 is an electromagnet) is powered on. In this case, the magnetic strip 17 absorbs the first slider 13 made of a metal material, and fixes a position of the first slider. By powering off the magnetic strip 17, the first spring 14 is returned back quickly. This pushes the first slider 13, the linkage plate 12, the fixed sleeve 10 and the needle 6 to move, and makes the needle 6 ejected and inserted into the soil. In response to use, an elastic value of the first spring 14 can be adjusted. By rotating the adjusting bolt 16, the second slider 15 can be pushed to change its position, thereby changing an accumulated force for the first spring 14.

In a further preferred embodiment of the present disclosure, top cover 18 for sealing the liquid storage chamber 2 is threadedly provided at a top of the barrel 1, and a handheld adjusting mechanism is provided on the top cover 18.

In the embodiment, the top cover 18 is configured to seal the liquid storage chamber 2. The handheld adjusting mechanism can be used for making an adjustment, so as to meet requirements of different people.

In a further preferred embodiment of the present disclosure, the handheld adjusting mechanism includes support stud 19 fixed at a top of the top cover 18; support threaded insert 20 threadedly sleeved on the support stud 19; U-shaped seat 21 fixed at a top of the support threaded insert 20; connecting member 22 adjustably provided on the U-shaped seat 21 with a bolt; and connecting rod 23 fixed on the connecting member 22 and provided with handle 24.

In the embodiment, when the handheld adjusting mechanism is used, the user can stand for the fixed-point disinfection by holding the handle 24 in a hand, without squatting down, thereby being more labor-saving in use. The U-shaped seat 21 and the connecting member 22 are mounted with the bolt, such that the user can adjust an angle according to a habit, thus being more comfortable in use. Meanwhile, by rotating the support threaded insert 20, a length of the support threaded insert 20 and a length of the support stud 19 can be adjusted, so as to be adapted for different people, and further improve the comfort.

In a further preferred embodiment of the present disclosure, the handheld adjusting mechanism includes support stud 19 threadedly provided on the top cover 18 in a penetrating manner; support threaded insert 20 threadedly sleeved on the support stud 19; U-shaped seat 21 fixed at a top of the support threaded insert 20; connecting member 22 adjustably provided on the U-shaped seat 21 with a bolt; connecting rod 23 fixed on the connecting member 22 and provided with handle 24; and air compression plate 33 slidably provided in the liquid storage chamber 2 and fixedly connected to the support stud 19. Air vents 34 communicating with each other are respectively formed in the support stud 19 and the air compression plate 33. Air adjusting tube 35 with a valve is fixed on the support threaded insert 20.

In the embodiment, when the handheld adjusting mechanism is used, the user can stand for the fixed-point disinfection by holding the handle 24 in a hand, without squatting down, thereby being more labor-saving in use. The U-shaped seat 21 and the connecting member 22 are mounted with the bolt, such that the user can adjust an angle according to a habit, thus being more comfortable in use. Meanwhile, by rotating the support threaded insert 20, a length of the support threaded insert 20 and a length of the support stud 19 can be adjusted, so as to be adapted for different people, and further improve the comfort.

While the liquid in the liquid storage chamber 2 decreases constantly, the liquid is inclined in use, and cannot be well pumped out by the water pump 7. In order to reduce flowing of the liquid, and ensure smooth pumping of the water pump 7, by rotating the support stud 19, the air compression plate 33 moves down along the liquid storage chamber 2 to compress a space in the liquid storage chamber 2. It is better to press the air compression plate 33 on a liquid level, so as to reduce shaking of the liquid and ensure a pumping effect of the liquid. Since the air vents 34 are vertically upward in use, the liquid does not flow upward. When the liquid is re-injected after use, the air compression plate 33 and the support stud 19 are restored. In order to reduce influences from an air pressure, the valve on the air adjusting tube 35 can be turned on, such that air flows to the support threaded insert 20, the support stud 19, the air vent 34 and the liquid storage chamber 2.

In a further preferred embodiment of the present disclosure, electric control box 25 is fixed on the linkage plate 12. Trigger switch 26 is detachably provided in the electric control box 25 by a lid. Trigger post 27 corresponding to the trigger switch 26 is slidably provided at a bottom of the electric control box 25.

In the embodiment, when the needle 6 is ejected, the linkage plate 12 moves down, such that the trigger post 27 is triggered by the ground. In this case, the trigger post 27 presses the trigger switch 26, and the trigger switch 26 controls operation of the water pump 7. Thereafter, the device is lifted up, such that the trigger post 27 moves away from the ground to turn off the trigger switch 26. The water pump 7 is started and stopped automatically, thereby being labor-saving.

In a further preferred embodiment of the present disclosure, grounding sheet 28 is fixed at a bottom of the trigger post 27. Second spring 29 and rubber sleeve 30 located between the electric control box 25 and the grounding sheet 28 are provided outside the trigger post 27. The second spring 29 is located in the rubber sleeve 30.

In the embodiment, the grounding sheet 28 at the bottom of the trigger post 27 contacts the ground. The second spring 29 is compressed when the trigger post is triggered. When the trigger post is restored, the second spring 29 is returned back. The rubber sleeve 30 can extend and retract freely to protect the second spring 29, thereby reducing rust of the second spring, prolonging a service life of the second spring, and ensuring a flexibility of the second spring in use.

In a further preferred embodiment of the present disclosure, an outer race of the target ring 5 is a threaded structure. Soil taking hood 31 is threadedly sleeved on the target ring 5. A bottom race of the soil taking hood 31 is provided in a cutting edge.

In the embodiment, when the device is used, if there is a need to sample the soil for analysis, the needle 6 is taken down, the soil taking hood 31 is screwed down, and the device is pressed down forcibly to insert the soil taking hood 31 into the soil for soil sampling. This expands an application range of the device, and makes the device multifunctional.

In a further preferred embodiment of the present disclosure, soil moisture content sensor 32 is fixed at one side of the linkage plate 12. An insertion end of the soil moisture content sensor 32 is lower than the grounding sheet 28.

In the embodiment, when the soil is disinfected, a soil moisture content is detected. When the linkage plate 12 moves down, the soil moisture content sensor 32 can be inserted into the soil, thereby analyzing the soil moisture content. This further expands the application scope of the device.

In conclusion, compared with a conventional method in which the needle is directly inserted by an arm, the device is more labor-saving and simpler in use by ejecting the needle 6 for piercing.

Compared with the related art, the device not only is more labor-saving and simpler in use by ejecting the piercing needle 6, but also can be adapted for different people and used more comfortably through the handle 24 with an adjustable angle and an adjustable length. The present disclosure supplies the liquid automatically in an automatic triggering manner. Furthermore, the present disclosure is multifunctional and low in cost, suitable for various usage scenarios.

It is to be noted that the device further includes waistband 36 capable of being worn by the user. Battery pack 37 is provided on the waistband 36. A storage battery and a controller are provided in the battery pack 37, so as to supply power to the device and control the device in use.

In several embodiments provided herein, it should be understood that the disclosed apparatus may be implemented in other manners. For example, the described apparatus embodiments are merely schematic. For example, division into the units is merely logical function division and may be other division in actual implementation. For example, a plurality of units or components may be combined or integrated into another system, or some features may be ignored or not performed. In other respects, the intercoupling or communication connection shown or discussed may be indirect coupling or communication connection through some interfaces, apparatuses, or units, or may be implemented in an electrical or other forms.

The above embodiments are only used for describing the technical solutions of the present disclosure, and are not intended to limit the protection scope of the present disclosure. Apparently, the described embodiments are some rather than all of the examples of the present disclosure. All other embodiment obtained by a person of ordinary skill in the art based on the embodiments of the present disclosure without creative efforts shall fall within the protection scope of the present disclosure. Although the present disclosure is described in detail with reference to the above embodiments, the person of ordinary skill can combine, add, delete or adjust features in the embodiments of the present disclosure according to situations without creative efforts if there is no conflict, thereby obtaining different other technical solutions with the essence not departing from the concept of the present disclosure. These technical solutions also fall within the protection scope of the present disclosure.

What is claimed is:

1. A handheld soil fixed-point disinfection device for a crop growth period, comprising:
   a top-opened barrel, wherein the top-opened barrel is internally divided into a liquid storage chamber and an assembly chamber;
   a plurality of support rods fixed at a bottom of the top-opened barrel;
   a target ring fixed at bottoms of the plurality of support rods and configured to contact a ground fixed point;
   a needle provided between the plurality of support rods and allowed to insert into soil through the target ring to inject a fumigant liquid; and
   a force accumulation mechanism provided on the top-opened barrel and configured to eject the needle, wherein a water pump is provided in the assembly chamber, and the water pump comprises a liquid feed tube and a liquid discharge tube, wherein the liquid feed tube communicates with the liquid storage chamber, and the liquid discharge tube extends out of the top-opened barrel and is detachably connected to the needle.

2. The handheld soil fixed-point disinfection device for the crop growth period according to claim 1, wherein a top cover for sealing the liquid storage chamber is threadedly provided at a top of the top-opened barrel, and a handheld adjusting mechanism is provided on the top cover.

3. The handheld soil fixed-point disinfection device for the crop growth period according to claim 2, wherein the handheld adjusting mechanism comprises:
a support stud threadedly provided on the top cover in a penetrating manner;
a connecting rod fixed on a connecting member and provided with a handle; and
an air compression plate slidably provided in the liquid storage chamber and fixedly connected to the support stud.

4. The handheld soil fixed-point disinfection device for the crop growth period according to claim 1, wherein an outer race of the target ring is a threaded structure, a soil taking hood is threadedly sleeved on the target ring, and a bottom race of the soil taking hood is provided in a cutting edge.

5. A handheld soil fixed-point disinfection device for a crop growth period, comprising:
a top-opened barrel, wherein the top-opened barrel is internally divided into a liquid storage chamber and an assembly chamber;
a plurality of support rods fixed at a bottom of the top-opened barrel;
a target ring fixed at bottoms of the plurality of support rods and configured to contact a ground fixed point;
a needle provided between the plurality of support rods and allowed to insert into soil through the target ring to inject a fumigant liquid; and
a force accumulation mechanism provided on the top-opened barrel and configured to eject the needle,
wherein the force accumulation mechanism comprises:
a fixed sleeve slidably provided between the plurality of support rods and detachably connected to the needle;
a force accumulation box fixed at a side of the top-opened barrel;
a linkage plate slidably provided at a bottom of the force accumulation box and fixedly connected to the fixed sleeve;
a first slider slidably provided in the force accumulation box and fixedly connected to the linkage plate;
a first spring provided in the force accumulation box and located at a top of the first slider;

a second slider slidably provided in the force accumulation box and located at a top of the first spring;
an adjusting bolt threadedly provided at a top of the force accumulation box and configured to abut against the second slider; and
a magnetic strip fixed at a side of the force accumulation box and configured to absorb and fix the first slider.

6. The handheld soil fixed-point disinfection device for the crop growth period according to claim 5, wherein an electric control box is fixed on the linkage plate, a trigger switch is detachably provided in the electric control box by a lid, and a trigger post corresponding to the trigger switch is slidably provided at a bottom of the electric control box.

7. The handheld soil fixed-point disinfection device for the crop growth period according to claim 6, wherein a grounding sheet is fixed at a bottom of the trigger post, a second spring and a rubber sleeve are provided outside the trigger post, the second spring and the rubber sleeve are located between the electric control box and the grounding sheet, and the second spring is located in the rubber sleeve.

8. The handheld soil fixed-point disinfection device for the crop growth period according to claim 7, wherein a soil moisture content sensor is fixed at a side of the linkage plate, and an insertion end of the soil moisture content sensor is lower than the grounding sheet.

9. A handheld soil fixed-point disinfection device for a crop growth period, comprising:
a top-opened barrel, wherein the top-opened barrel is internally divided into a liquid storage chamber and an assembly chamber;
a plurality of support rods fixed at a bottom of the top-opened barrel;
a target ring fixed at bottoms of the plurality of support rods and configured to contact a ground fixed point;
a needle provided between the plurality of support rods and allowed to insert into soil through the target ring to inject a fumigant liquid; and
a force accumulation mechanism provided on the top-opened barrel and configured to eject the needle, wherein a top cover for sealing the liquid storage chamber is threadedly provided at a top of the top-opened barrel, and a handheld adjusting mechanism is provided on the top cover,
wherein the handheld adjusting mechanism comprises:
a support stud fixed at a top of the top cover;
a support threaded insert threadedly sleeved on the support stud;
a U-shaped seat fixed at a top of the support threaded insert;
a connecting member adjustably provided on the U-shaped seat with a bolt; and
a connecting rod fixed on the connecting member and provided with a handle.

* * * * *